United States Patent Office 3,042,652
Patented July 3, 1962

3,042,652
ELASTOMERIC COMPOSITION COMPRISING A BENZENE-SOLUBLE CHLOROPRENE POLYMER AND A BENZENE-INSOLUBLE RADIATION CROSS-LINKED CHLOROPRENE POLYMER
Rudolph Pariser, Brandywine Hundred, and Robert D. Souffie, Mill Creek Hundred, Del., assignors to E. I. du Pont de Nemours and Company, Wilmington, Del., a corporation of Delaware
No Drawing. Filed July 31, 1959, Ser. No. 830,734
7 Claims. (Cl. 260—45.5)

This invention relates to novel elastomers and more particularly to easily processable elastomers comprising blends of chloroprene polymers.

It has long been known that chloroprene polymer elastomers may be increased in plasticity by being prepared in the presence of so-called modifying agents or by being treated, after their formation, with plasticizing agents. The control of plasticity, however, is not the whole answer to the problem of producing an elastomer which has good working properties, that is, is capable not only of being easily formed into the desired shape by passage between the rolls of a rubber mill or by extrusion through a die, but also of retaining its shape, size, and smooth surface after the force by which it has been molded is removed. Elastomers in general do not completely retain the exact size and shape into which they are formed by a rubber-working machinery. This characteristic, known as nerve or "elastic memory," is present in chloroprene polymers to a greater extent than in natural rubber and somewhat interferes with its use in certain delicate operations such as the high-speed extrusion of complicated shapes.

It is an object of the present invention to provide an elastomer which may be easily processed. A further object is to provide an elastomer comprising a blend of chloroprene polymers, which elastomer has greatly improved working properties. A further object is to provide a process for the preparation of an improved elastomer comprising a blend of chloroprene polymers. Other objects will appear hereinafter.

These and other objects of this invention are accomplished by an easily processable elastomer comprising an intimate blend of (a) a plastic, benzene-soluble chloroprene polymer and (b) a cross-linked, benzene-insoluble chloroprene polymer obtained by exposing a chloroprene polymer in latex form to ionizing radiation producing the effect obtained by exposure to at least $3 \times 10^6$ rads of 0.5 to 5.0 mev. beta radiation at a dose rate of about $10^5$ to $10^7$ rads per second, the ratio of (a) to (b) on a weight basis being between about 1:4 and about 4:1. One rad is the quantity of radiation which will result in an energy absorption of 100 ergs per gram of irradiated material.

The novel easily processable elastomer of the present invention is obtained by blending a plastic, benzene-soluble chloroprene polymer with a cross-linked benzene-insoluble chloroprene polymer which has been exposed to a prescribed amount of ionizing radiation. In other words, the elastomer is a blend of irradiated and unirradiated chloroprene polymers.

The plastic, benzene-soluble chloroprene polymer component of the elastomer is a polymer obtained by the polymerization of chloroprene, i.e., 2-chloro-1,3-butadiene. These chloroprene polymers are described in U.S. Patents 1,950,436; 2,227,517; 2,234,215; 2,371,719; 2,463,225 and 2,481,044.

The preferred chloroprene polymer is obtained by partial polymerization of chloroprene in the presence of an aliphatic mercaptan such as dodecyl mercaptan. It is to be understood that the term "chloroprene polymers," as used throughout the present specification, is intended to include the polymers of 2-chloro-1,3-butadiene as well as copolymers of this butadiene with up to about 10% by weight of other polymerizable ethylenically unsaturated monomers such as styrene, acrylic nitrile, methyl methacrylate, butadiene and 2,3-dichlorobutadiene-1,3.

The irradiated or cross-linked benzene-insoluble chloroprene polymer may be any of the chloroprene polymers described above which have been subjected to ionizing radiation. Prior to radiation these chloroprene polymers may originally be plastic or non-plastic but when they are subjected to ionizing radiation they should be in the form of an emulsion or latex. The solids content of the latex is not critical and may range from about 20 to 60%. The manner in which these chloroprene polymers are subjected to ionizing radiation as well as the amount of such radiation will be more fully discussed hereinafter.

The proportion of irradiated chloroprene polymer in the blend of the present invention may range from about 20 to about 80% by weight. As the amount of irradiated chloroprene polymer in the blend increases, the working properties of the elastomer, as shown by the nerve number, tend to improve and ultimately pass through a maximum. When the blend contains more than about 80% of irradiated chloroprene polymer the working properties of the elastomer tend to be unsatisfactory. At the lower end of the range, i.e. around 20%, the tensile properties of the elastomer tend to be improved. The preferred amount of irradiated chloroprene polymer in the total blend is from about 45 to 50%. The preferred weight ratio of irradiated to plastic polymer in the blend is between 9:11 and 11:9.

In addition to the two components in the novel elastomer of the present invention, i.e. the plastic, soluble chloroprene polymer and the cross-linked, insoluble chloroprene polymer, a third component may be present if desired. This third component is a fluid chloroprene polymer which may be present in an amount of up to about 20% by weight of the elastomer. This fluid chloroprene polymer, which cures along with the other chloroprene polymers, may be prepared in a manner similar to that which is used in the preparation of the plastic chloroprene polymers except that when preparing the fluid chloroprene polymers, larger amounts of the mercaptans are used. By fluid chloroprene polymer is meant one having an intrinsic viscosity in benzene not greater than 0.1. When using the fluid chloroprene polymer as a third component, the resulting elastomer after extrusion tends to have a smooth surface.

As mentioned above, one of the components of the blend is a cross-linked, benzene-insoluble chloroprene polymer which is obtained by exposing a chloroprene polymer in latex form to ionizing radiation. Suitable ionizing radiation includes both radiation in the form sometimes regarded as particle radiation and radiation in the form sometimes regarded as ionizing electromagnetic radiation.

By particle radiation is meant a stream of particles such as electrons, protons, neutrons, alpha-particles, deuterons, beta-particles, or the like, so directed that the said particle impinges upon the chloroprene polymer in latex form. The charged particles may be accelerated by means of a suitable voltage gradient, using such devices as a cathode ray tube, resonant cavity accelerator, a Van de Graaff accelerator, a Cockcroft-Walton accelerator, or the like, as is well known to those skilled in the art. Neutron radiation may be produced by suitable nuclear reactions, e.g., bombardment of a beryllium target with deuterons or alpha-particles. In addition, particle radiation may be obtained from an atomic pile, or from radioactive isotopes or from other natural or artificial radioactive materials.

By ionizing electromagnetic radiation is meant radiation of the type produced when a metal target (e.g., gold or tungsten) is bombarded by electrons possessing appropriate energy. Such radiation is conventionally termed X-ray. In addition to X-rays produced as indicated above, ionizing electromagnetic radiation may be used and may be obtained from a nuclear reactor ("pile") or from natural or artificial radioactive material. In all of these latter cases the radiation is conventionally termed gamma rays.

It is recognized that the energy characteristics of one form of ionizing radiation can be expressed in terms which are appropriate for another form. Thus, it is acceptable to refer to energy equivalents between, for example, radiation commonly considered as particle radiation and radiation commonly considered as wave or electromagnetic radiation. The effect of the ionizing radiation upon a chloroprene polymer, altering it in such a way that it gives blends of improved processing properties, depends on the type of radiation, the dosage (energy absorbed per weight unit of chloroprene polymer) and the dose rate (dosage per unit of time), with the latter two varying over very wide ranges. At present, the relation of these variables is not fully explored. In each case, however, there is a readily determined minimum dosage, dependent upon the dose rate and type of radiation, which will produce the effect upon the chloroprene polymer required by the present invention. For beta radiation at a dose rate of about $10^5$ to $10^7$ rads per second, this minimum dose is about $3 \times 10^6$ rads. For 3 mev. gamma radiation at a dose rate of 12.5 to 1250 rads per second, this minimum is about $1.5 \times 10^6$ rads. A particle energy of 0.5 to 5.0 mev. is usually preferred.

The amount of ionizing radiation used to cross-link the chloroprene polymer in the latex form is critical. Thus, it is not enough merely to irradiate since a wide range of lower amounts of radiation produces a cross-linked chloroprene polymer which in the blend results in an elastomer which does not show the desired improvement in working properties. As mentioned above, the chloroprene polymer in latex form should be subjected to a dose equivalent to at least $3 \times 10^6$ rads of 0.5 to 5.0 mev. beta particle radiation at a dose rate of about $10^5$ to $10^7$ rads per second. When the irradiation is above about this figure, the working properties of the blends are better than those of the chloroprene polymer plastic component per se and the working properties are improved further with further increase of irradiation. It has been determined that at the higher irradiation levels there is a definite but not serious decrease of tensile properties of the elastomer. By varying the amount of irradiation of the cross-linked chloroprene polymer an elastomer may be obtained of essentially unchanged tensile properties and much improved extruding properties or an elastomer may be obtained having lower tensile properties with especially good working properties. In general, the quantity of irradiation should not exceed the effect obtained by exposure to about $25 \times 10^6$ rads of 0.5 to 5.0 mev. beta radiation at a dose rate of about $10^5$ to $10^7$ rads per second.

After the chloroprene polymer in latex form has been irradiated to form a cross-linked insoluble chloroprene polymer, the irradiated and unirradiated plastic soluble chloroprene polymer may be blended by mixing the two components as latices and then isolating the blend by conventional means such as coagulation by freezing. It is also possible to blend the two components as solids, even though one of them is non-plastic, by mechanical means, for example milling or by working in an internal mixer, such as a Banbury or Werner-Pfleiderer mill.

The compounding of the elastomers of the present invention is like that of the plastic chloroprene polymers, as described in "The Neoprenes" published in 1953 by E. I. du Pont de Nemours and Co. In the examples, a fairly high loading of clay is used as is customary in making tubing and other extruded articles, but the elastomers may also be used to advantage in gum stocks and stocks reinforced with carbon black. Waxes, oils and other softeners and lubricants should in general be used but large amounts are not necessary. The optional fluid chloroprene polymer in the blends may be replaced partly or wholly by various oils and softeners without much change in processing characteristics but with some loss of tensile properties.

The novel elastomers of the present invention which are made up of a blend of two different chloroprene polymers and, if desired, a third component which is a fluid chloroprene polymer, display greatly improved working properties. Although the greatly improved working properties of the elastomers of this invention are described in the following examples largely in terms of extrusion stocks, their properties also make them valuable in friction and calender stocks. These elastomers may be employed for the same purposes as the plastic chloroprene polymer elastomers which are now produced commercially. Thus, they may be processed in any form of rubber-working equipment, such as internal mixers, compounding mills, calenders, extruders and the like, in fabricating tires and mechanical goods of all kinds, coated fabrics, tubing, coated wire, and extruded gaskets. The elastomers are particularly valuable where it is important to have a smooth surface and minimum shrinkage.

The following examples will better illustrate the nature of the present invention; however, the invention is not intended to be limited to these examples. Parts are by weight unless otherwise indicated.

*Example 1*

(A) A polychloroprene latex made by polymerizing chloroprene dispersed in a sodium rosinate solution in the presence of about 0.25 percent of dodecyl mercaptan so as to give a plastic product when isolated directly, is used as the starting material. In making this latex, polymerization is carried to about 70 percent of completion at 40° C. and the unchanged chloroprene is removed by distillation. This latex contains about 38 percent of polychloroprene.

(B) Part of the latex prepared in A above is irradiated with 2 mev. beta radiation from a Van de Graaff electrostatic generator operated at a beam current of 250 microamperes corresponding to a power output of 500 watts. The latex (one liter at a time) is contained in a pan measuring 8 by 24 inches and made of stainless steel, covered with a film of polyethylene terephthalate 0.0075 inch thick, in a nitrogen atmosphere. This pan is moved on a grounded aluminum table 10 cms. below the aluminum exit window of the generator at such a rate that it is exposed to the radiation for 1.1 second per pass. The power per square centimeter of latex surface is approximately 10 watts and the absorption is 11 watt-seconds per pass. This corresponds to $1.1 \times 10^6$ rads per pass. The layer of latex is approximately 1 cm. thick and the radiation is substantially completely absorbed therein. After irradiation for 5 passes (at room temperature), a quantity of a "short-stop" dispersion containing 0.03 percent, based on the weight of the polymer, of tertiary-butyl catechol and 0.03 percent phenothiazine, is added to prevent any further alteration. The latex is then ready for blending with other latices, as in some of the following examples.

In the present example the irradiated polymer is isolated by adjusting the pH to 5.6 with acetic acid and coagulating by freezing in a thin layer on a rotating drum at −15° C., removing the polymer as a continuous sheet, washing with water at 45° C., and drying. The polymer is then ready for dry blending with the other ingredients.

(C) A fluid polychloroprene latex is made by polymerizing in a sodium rosinate solution in the presence of 5 percent of dodecyl mercaptan at 40°, coagulating with acid and isolating and drying the fluid product.

(D) A blend is now made from 45 parts of the irradiated polymer prepared in B above, 5 parts of the fluid polymer prepared in C above, and 50 parts of an unirradiated plastic polymer which has been isolated directly from the latex prepared in A above. The blending of the dry components is carried out in an internal mixer during the compounding step. The non-plastic, irradiated polymer is rapidly dispersed with the compounding ingredients giving a plastic, easily worked mass. The clay stock used to evaluate the product has the following composition:

| | Parts |
|---|---|
| Polymer blend | 100 |
| Phenyl alphanaphthylamine | 1 |
| Magnesium oxide | 4 |
| Zinc oxide | 5 |
| Clay | 90 |
| Lubricating oil | 12 |
| Paraffin wax | 1 |
| Petrolatum | 1 |
| 2-Mercaptoimidazoline | 0.5 |

The resulting stock shows very good working properties and cures readily at 307° F. for 30 minutes to a vulcanizate having excellent physical characteristics. A comparison is also made with the plastic, unirradiated component of the blend alone and with a commercial chloroprene polymer of excellent processing characteristics, made by another method. The properties of these are:

| | Blend of this Example | Plastic polychloroprene polymer | Commercial polychloroprene designed for excellent processing |
|---|---|---|---|
| Nerve No | 1.5 | 3.8 | 1.5 |
| Tensile strength at break, 25° C., lbs./sq.in. | 2,435 | 2,385 | 1,707 |
| Elongation at break, 25° C., Percent | 740 | 750 | 620 |
| Modulus at 300% elongation, 25° C., lbs./sq.in. | 1,000 | 650 | 635 |

The above stocks are also compared after extrusion through a two inch Royle extruder operating at 35 r.p.m. fitted with a Garvey die, at 205° F. The stock from the blend of this example gives a very smooth extrudate with a continuous "feather edge." The "die swell," i.e., the weight in grams of one inch of extrudate is 1.86, which is very low. In all these respects the stock is at least as good as the commercial polychloroprene designed for excellent processing and is much superior to the plastic unirradiated polychloroprene which has a die swell of 2.29 and gives a rough extrudate with a broken "feather edge." Note also that the tensile properties of the blend of this example are as good as those of the plastic polychloroprene polymer.

In quantitatively evaluating the working properties of the elastomers of this invention, an unofficial test has been used, which give a quantity called the "nerve number." A 50-gram sample of the elastomer to be tested is milled for 6 minutes at 50° C. on a laboratory rubber mill with rolls 2 by 6 inches, and is then sheeted off with the mill clearance set at 25 mils. The sheet is allowed to stand 20 minutes at room temperature. Strips 1 by 2 inches are then cut out and weighed. The average final thickness of the strips, which have thickened to a greater or less extent depending on the nerve of the material, is calculated from the weight, area, and density of the strip. The nerve number is the ratio of the final to the original thickness, minus 1. The nerve number is determined prior to curing.

In all of the following examples, the elastomers are compounded with the same formula as listed in Part D of this example and all the stocks are cured at 307° F. for 30 minutes.

*Example 2*

Example 1 is repeated with the exception that the plastic, unirradiated chloroprene polymer is a copolymer which contains about 3 percent of 2,3-dichlorobutadiene-1,3. The irradiated polymer and the fluid latex are the same as used in Example 1. The properties of the blended polymer and that of the plastic unirradiated polymer are as follows:

| | Blend of this Example | Plastic chloroprene polymer alone |
|---|---|---|
| Nerve No | 1.5 | 3.6 |
| Tensile strength at break, 25°C., lbs./sq. in. | 2,390 | 2,420 |
| Elongation at break, 25°C., percent | 700 | 780 |
| Modulus at 300% elongation, 25°C., lbs./sq. in. | 939 | 780 |

*Example 3*

This example is identical with Example 1 except that the polymer to be irradiated is made without mercaptan and is therefore non-plastic and that all three components are blended in the form of the latices in which they are made and the material is isolated from blended latex by freezing as described in Example 1 (B). The irradiated polymer, plastic polymer and fluid polymer are in the ratio of 49:46:5. This latex blending procedure is used in all the following examples. The elastomer has the following excellent processing properties:

| | |
|---|---|
| Nerve No. | 1.5 |
| Tensile strength at break, 25° C., lbs./sq. in. | 1,815 |
| Elongation at break, 25° C., percent | 620 |
| Modulus at 300% elongation, 25° C., lbs./sq. in. | 735 |

*Example 4*

This is not an embodiment of the invention, since the amount of irradiation to obtain the cross-linked, insoluble polychloroprene is only 2 passes, or $2.2 \times 10^6$ rads. The irradiated polymer, plastic polymer and fluid polymer are in the ratio 50:45:5 and are blended as latices, the example being otherwise identical with Example 1. The product, however, is tough and much less readily milled than the plastic polymer from which it is largely derived and cannot be satisfactorily extruded. The nerve number is 5+.

*Example 5*

This is identical with Example 4, except that the amount of irradiation to obtain the cross-linked, insoluble polychloroprene is $3.3 \times 10^6$ rads or 3 passes. The elastomer, isolated from the blended latices, has somewhat better working properties than the plastic starting material itself. The properties of the elastomer from the blend are as follows:

| | |
|---|---|
| Nerve No. | 2.6 |
| Tensile strength at break, 25° C., lbs./sq. in. | 2,100 |
| Elongation at break, 25° C., percent | 710 |
| Modulus at 300% elongation, 25° C., lbs./sq. in. | 888 |

*Examples 6 and 7*

These are identical with Example 5 except for higher irradiation (5 and 10 passes, respectively) and a very minor change in polymer ratio to 47:48:5. The properties are as follows:

| | Example 6 5 passes | Example 7 10 passes |
|---|---|---|
| Nerve No | 1.6 | 1.3 |
| Tensile strength at break, 25°C., lbs./sq. in. | 2,162 | 1,885 |
| Elongation at break, 25°C., percent | 750 | 670 |
| Modulus at 300% elongation, 25°C., lbs./sq. in. | 758 | 737 |

Example 8

This is identical with Examples 5 through 7 except for a still higher irradiation (20 passes) and another very minor shift in ratio to 48:47:5. The properties are as follows:

| | |
|---|---|
| Nerve No. | 0.9 |
| Tensile strength at break, 25° C., lbs./sq. in. | 1,400 |
| Elongation at break, 25 ° C., percent | 470 |
| Modulus at 300% elongation, 25° C., lbs./sq. in. | 922 |

Example 9

This is identical with Example 8 except that there is no fluid polymer in the blend, the ratio of irradiated to unirradiated polymer being 50:50. The tensile properties are improved by this omission but extrudates lack the extreme smoothness of Example 8. The properties are as follows:

| | |
|---|---|
| Nerve No. | 0.9 |
| Tensile strength at break, 25° C., lbs./sq. in. | 1,875 |
| Elongation at break, 25° C., percent | 500 |
| Modulus at 300% elongation, 25° C., lbs./sq. in. | 1,067 |

Example 10

This is identical with Example 9 except that the ratio of irradiated to unirradiated polymer is 25:75. The properties are as follows:

| | |
|---|---|
| Nerve No. | 1.7 |
| Tensile strength at break, 25° C., lbs./sq. in. | 2,160 |
| Elongation at break, 25° C., percent | 670 |
| Modulus at 300% elongation, 25° C., lbs./sq. in. | 848 |

Example 11

This is identical with Example 6 except that the ratio of irradiated, plastic and fluid polymers 75:20:5. The properties are as follows:

| | |
|---|---|
| Nerve No. | 1.3 |
| Tensile strength at break, 25° C., lbs./sq. in. | 1,825 |
| Elongation at break, 25° C., percent | 670 |
| Modulus at 300% elongation, 25° C., lbs./sq. in. | 748 |

Example 12

This is identical with Example 5 except that the irradiation of the plastic polymer is by X-rays obtained from the Van de Graaff generator by allowing the beta particle beam to impinge on a gold target. The beam current is 500 microamps, the voltage 3 mev. and the dose rate 7500 rads per minute, for 4 hours giving a dose of $1.8 \times 10^6$ rads. The properties are as follows:

| | |
|---|---|
| Nerve No. | 1.9 |
| Tensile strength at break, 25° C., lbs./sq. in. | 2,225 |
| Elongation at break, 25° C., percent | 800 |
| Modulus at 300% elongation, 25° C., lbs./sq. in. | 550 |

As many widely different embodiments of this invention may be made without departing from the spirit and scope thereof, it is to be understood that this invention is not limited to the specific embodiments thereof except as defined in the appended claims.

We claim:

1. An easily processable elastomer comprising an intimate blend of (a) a plastic, benzene-soluble chloroprene polymer and (b) a cross-linked, benzene-insoluble chloroprene polymer obtained by exposing a chloroprene polymer in latex form to ionizing radiation producing the effect obtained by exposure to at least $3 \times 10^6$ rads of 0.5 to 5.0 mev. beta radiation at a dose rate of about $10^5$ to $10^7$ rads per second, the ratio of (a) to (b) on a weight basis being between about 1:4 and about 4:1, said chloroprene polymers being selected from the group consisting of polychloroprene and copolymers of chloroprene with up to about 10 percent by weight of another polymerizable ethylenically unsaturated monomer.

2. An elastomer according to claim 1 wherein the ionizing radiation is in the form of 2.0 mev. beta radiation at a dose rate of about $10^6$ rads per second.

3. An elastomer according to claim 1 wherein the ionizing radiation is in the form of 3 mev. gamma radiation at a dose rate of 12.5 to 1250 rads per second for a dose of at least $1.5 \times 10^6$ rads.

4. An easily processable elastomer consisting essentially of an intimate blend of (a) a plastic, benzene-soluble chloroprene polymer, (b) a cross-linked, benzene-insoluble chloroprene polymer obtained by exposing a chloroprene polymer in latex form to ionizing radiation producing the effect obtained by exposure to at least $3 \times 10^6$ rads of 0.5 to 5.0 mev. beta radiation at a dose rate of about $10^5$ to $10^7$ rads per second, and (c) a fluid chloroprene polymer prepared by polymerizing chloroprene in the presence of enough mercaptan so that the resulting chloroprene polymer has an intrinsic viscosity in benzene of not greater than 0.1; the ratio of (a) to (b) on a weight basis being between about 1:4 and 4:1, the amount of (a) and (b) comprising at least about 80 percent by weight of the blend and the amount of (c) comprising no more than about 20 percent by weight of the blend, said chloroprene polymers being selected from the group consisting of polychloroprene and copolymers of chloroprene with up to about 10 percent by weight of another polymerizable ethylenically unsaturated monomer.

5. An elastomer according to claim 4 wherein the ionizing radiation is in the form of 2.0 mev. beta radiation at a dose rate of about $10^6$ rads per second.

6. An elastomer according to claim 4 wherein the ionizing radiation is in the form of 3 mev. gamma radiation at a dose rate of 12.5 to 1250 rads per second for a dose of at least $1.5 \times 10^6$ rads.

7. An elastomer according to claim 4 wherein the weight ratio of plastic chloroprene polymer to irradiated chloroprene polymer is between about 9:11 and 11:9.

No references cited.